June 29, 1926.
J. E. NEAHR
MATCH SAFE
Filed March 31, 1923 4 Sheets-Sheet 1
1,590,202
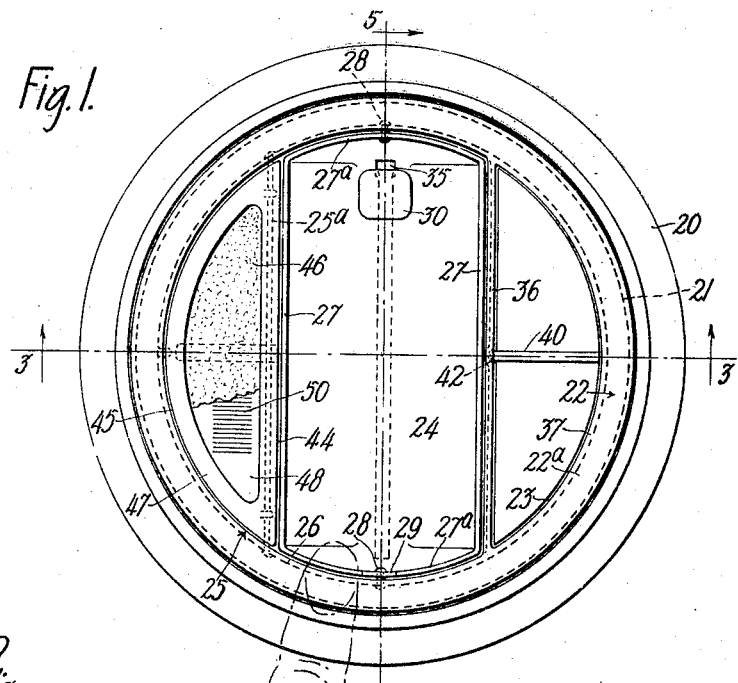
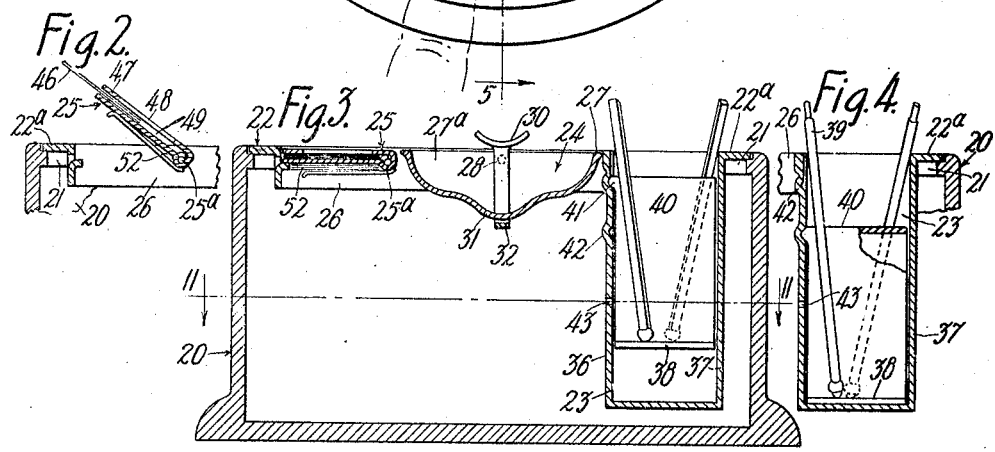
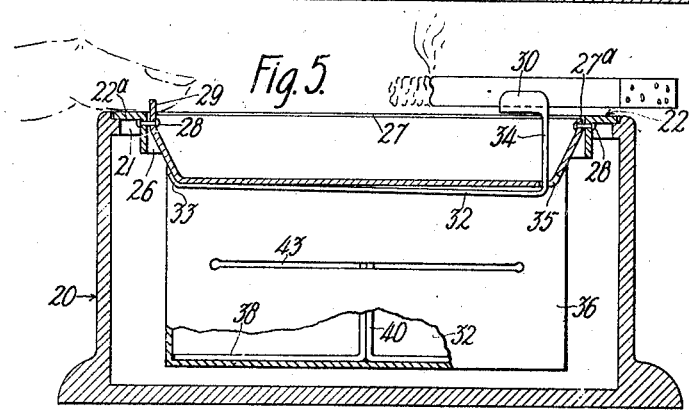
Inventor:
Jacob E. Neahr
by O. B. Stickney
Attorney June 29, 1926.
J. E. NEAHR
MATCH SAFE
Filed March 31, 1923 4 Sheets-Sheet 2
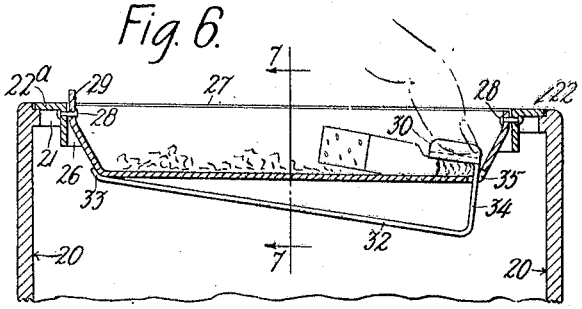
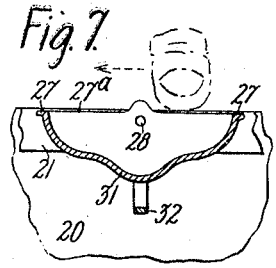
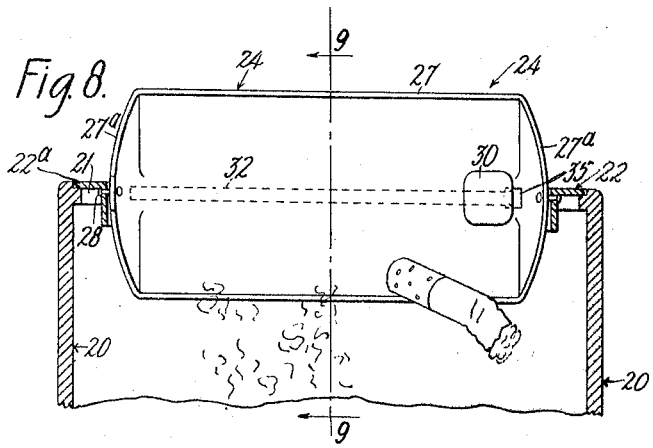
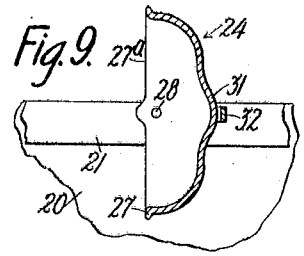
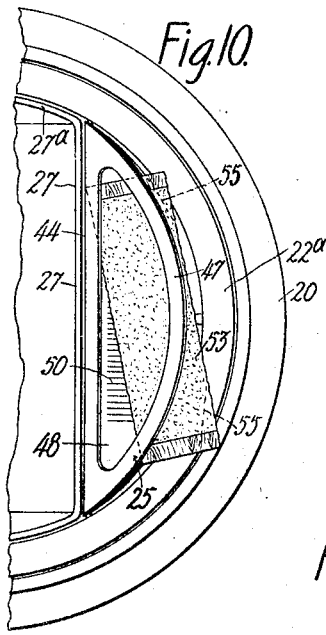
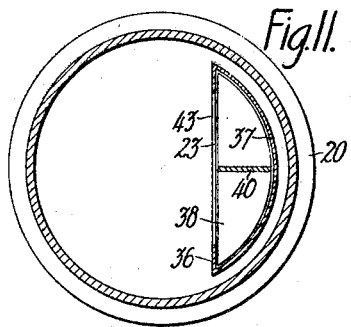
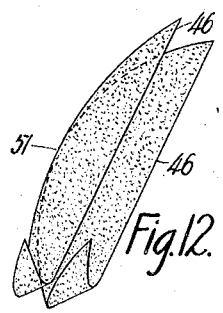
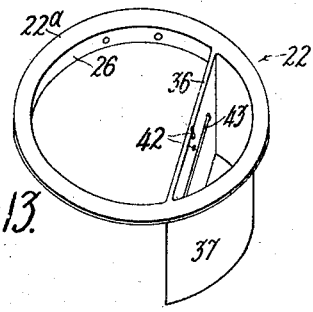
Inventor:
Jacob E Neahr
by D C Stickney
Attorney June 29, 1926.

J. E. NEAHR 1,590,202

MATCH SAFE

Filed March 31, 1923    4 Sheets-Sheet 3

Inventor:
Jacob E Neahr
by D C Stickney
Attorney

June 29, 1926.
J. E. NEAHR
MATCH SAFE
Filed March 31, 1923  4 Sheets-Sheet 4
1,590,202
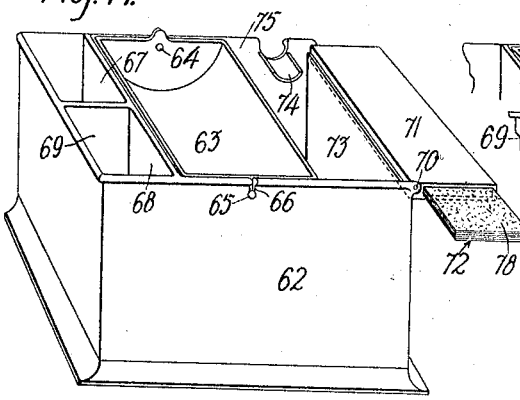
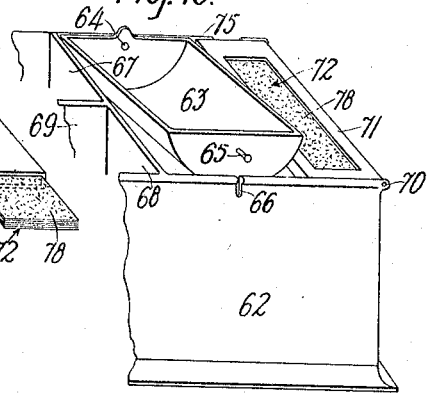
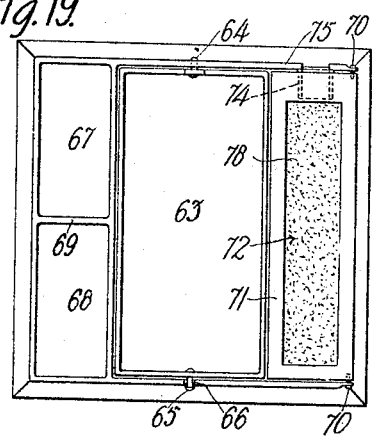
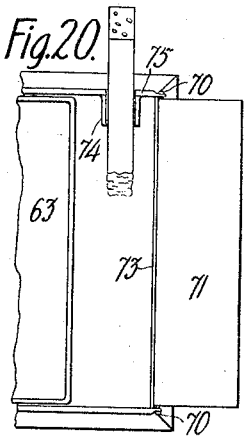
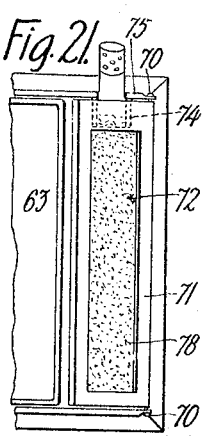
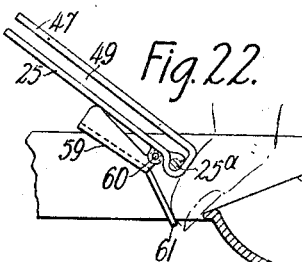
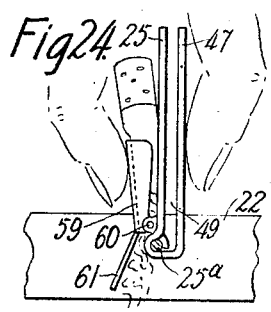
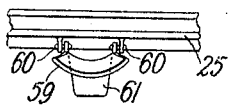
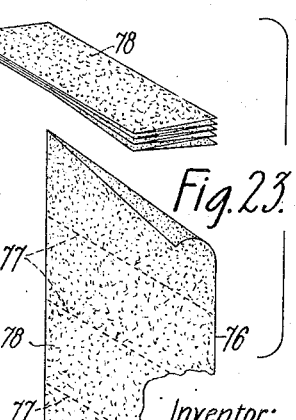
Inventor:
Jacob E. Neahr
by B.C. Stickney
Attorney Patented June 29, 1926.

1,590,202

UNITED STATES PATENT OFFICE.

JACOB E. NEAHR, OF HARTSDALE, NEW YORK.

MATCH SAFE.

Application filed March 31, 1923. Serial No. 629,012.

This invention relates mainly to a combined match-safe and ash-receiver for desk or table use.

One of the objects of the invention is to provide an inexpensive, durable, shapely, compact and attractive device having provision for containing the matches, for igniting them, and for satisfactorily disposing of burnt matches, ashes and butts. Another feature of the invention is the provision of novel means for extinguishing a cigar or cigarette.

It is one of the aims of the invention to produce a device which will never become unsightly but will always appear clean and tidy, with no matches or other débris in evidence, nor odor from smoke or from the contents of the ash-receiver which forms part of the device.

One of the particular features of the invention is in the nature of an improved tray for the burnt matches, ashes, butts, etc., which may be readily overturned, thus dumping its contents into the receiver.

Flanking the ash-tray, is a safe and on the other side of the ash-tray is a novel match-striking tablet. These devices fill a framing which comprises an annular brim that is seated upon the main ash-receiver. When it is desired to dump the latter, it is only necessary to lift out the framing with the parts carried thereby.

In the ash-tray is preferably provided a cigar extinguisher, in the form of a finger-piece which normally stands above the tray but which may be used to extinguish the cigar by pressing it down against the bottom of the tray.

One of the advantages of the invention is that there can be utilized the match-striking surfaces which usually form parts of the common pocket safety-match box.

Other features and advantages will hereinafter appear.

In the accompanying drawings,

Figure 1 is a plan of the present improvements embodied in one form. Figures 1 to 13 show the parts shaped and fitted to give the device a circular contour or style.

Figure 2 is a fragmentary sectional elevation to illustrate the match-tablet swung up for the introduction or removal of an ignition leaf.

Figure 3 is a sectional elevation taken at about the line 3 of Figure 1.

Figure 4 is a sectional fragmentary elevation taken through the match-receptacle, showing the floor depressed for use with long matches.

Figure 5 is a sectional elevation at about the line 5 of Figure 1, and illustrates the manner of rocking or rotating the ash-receiver.

Figure 6 is a view similar to Figure 5 but illustrating the manner of extinguishing a cigarette.

Figure 7 is a cross-section through the ash-tray, illustrating the manner of rocking the same.

Figures 8 and 9 are views similar to Figures 5 and 7, but showing the ash-tray tipped up to discharge its contents into the main ash-receiver.

Figure 10 illustrates the use in the device of a stripped-off side of an ordinary match-box as a match-striking leaf.

Figure 11 is a sectional plan showing the lower portion of the main ash-receiver and the match-receiver.

Figure 12 is a perspective of a double-coated double leaf for use with the match-striker table.

Figure 13 is a perspective of the framing with its attached pendent match-receiver, the ash-tray and match-striking tablet being removed.

Figures 17 is a perspective view of a square ash-receiver in which is directly attached the ash-tray, the match-receptacle and the match-striker, the latter being swung open.

Figure 18 is a similar view, showing the method of removal of the ash-tray.

Figure 19 is a plan of the Figure 17 article, showing the match-striking tablet or lid closed.

Figure 20 is a plan to illustrate the resting of a cigarette upon the cigar-holder when the match-striking lid is open.

Figure 21 is a fragmentary plan of the Figure 19 article, showing the manner of extinguishing a cigarette.

Figure 22 is a fragmentary sectional elevation corresponding to Figures 2 and 3, but showing the finger-piece or lifter as formed upon the pinching device instead of upon the hinged match-striking tablet.

Figure 23 is a perspective view, showing a web having cross-perforations, and also showing a portion cut off from the web and zigzag folded to form a pack of match-striking leaves or slips for insertion into the match-striking tablet seen in other views.

Figure 24 illustrates the manner of extinguishing a cigarette by the device seen at Figure 22.

Figure 25 is a fragmentary elevation to illustrate the match-extinguishing device seen at Figure 24.

Figure 14:
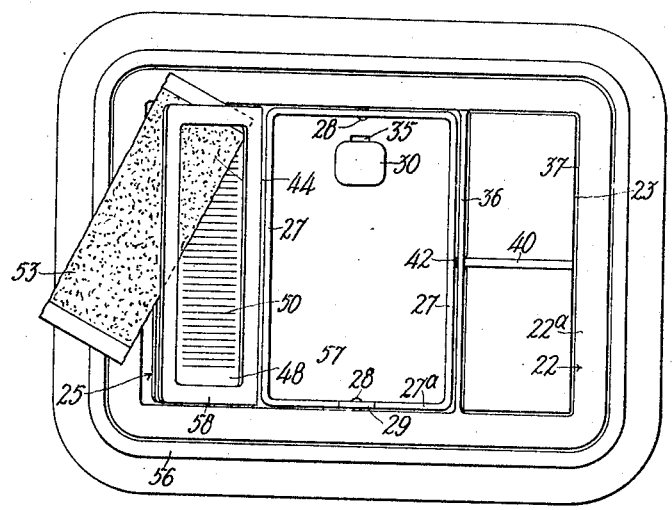
Figure 14 is a plan of the device formed in a square or oblong style, which is especially useful where it is desired to employ a stripped-off side of a common match-box for a striking tablet.

The main ash-receiver may be in the form of a box, bowl or vase 20, Figures 1–5, and is preferably ornamented, and may be formed in a variety of designs. At its top this ash-receiver may be provided with an internal support preferably in the nature of an interior flange 21, placed somewhat below the brim of the ash-receiver, to form a circular shelf upon which to rest the framing 22 of the combined match-safe 23, ash-tray 24 and match-striking tablet 25. This framing 22 is annular, and from it depends the pocket forming the match-safe 23. Said framing comprises a rim 22ª to fit down within the top of the main ash-receiver, and also comprises a short stiffening flange 26 extending down from said rim and serving as a support upon which other devices are mounted.

The ash-tray 24 preferably has parallel side edges 27 and rounded closed ends 27ª, forming a trough extending across the top of the main ash-receiver, and is swiveled at said ends upon pivot pins 28 projecting inwardly from the flange 26 of the skeleton framing 22. Upon these pins the ash-tray may be revolved to dump its contents into the receiver 20. This ash-tray is pendent, being mainly below its pivots, so that it tends to take a horizontal position, which enables it to serve as a cover or closure for the main ash-receiver. It is light and may be easily rotated by means of a finger-piece 29 provided upon one end thereof near a pivot 28. The sides and ends of the tray are curved or dished to merge into one another without making sharp corners, so that the tray is easily cleared by dumping, and is easy to wipe clean.

In the ash-tray is arranged a cigar-extinguisher in the form of a normally elevated or open pincher 30, which may be pressed down against the bottom of the ash-tray, and which may be curved on its under side to correspond with the curvature of the depressed middle portion 31 of the ash-tray. This extinguisher or pincher 30 may be concave to receive the finger of the user, whereby it may be pushed down to pinch the lighted cigar end against the bottom of the tray to extinguish it, the cigarette resting in the depressed middle portion 31 of the tray. To restore the extinguisher, it is provided with a spring 32 which is in the nature of a leaf spring extending beneath the tray from one end to the other and having one end attached thereto at 33, said spring terminating in a vertical finger 34 which extends up through an aperture 35 in the bottom of the tray and at its top is bent over to form the extinguisher 30. The latter because of its concave top may serve normally as a cigar rest, as shown at Figure 5.

Close to the ash-tray is a match-receiver in the form of a side pocket 23 extending down from the skeleton framing 22 and of segmental contour at Figure 1, this pocket comprising a straight vertical wall 36 which flanks the ash-tray, a curved outer wall 37 (Figures 11 and 13) which descends from the skeleton framing 22, and a segment-shaped floor 38 upon which the matches 39 stand with their upper ends protruding from the top. This floor 38 is made adjustable up and down for the purpose of accommodating matches of different lengths. To effect this adjustment, there extends up from the floor a finger-piece or leaf 40 which has at its upper end a projection 41, Figure 3, to snap into either of upper and lower depressions 42 formed in the straight side wall 36 of the match pocket, which is slotted at 43 to permit it to be sprung by said projection 41. The floor is thus maintained in either upper or lower position (Figure 4); the upper position desired when the match receiver is to be used for the short matches, Figure 3. Said leaf or finger-piece 40 may be formed integral with said floor 38, and for this purpose may consist of a strip of metal folded at its top to form a double partition in the match-box, portions extending out from the bottom of the partition to form the match floor 38, to rest upon the main floor of the box when depressed.

The opposite side portion of the skeleton framing from the match-box is filled by a match-striking tablet 25 of segmental contour. It will be seen that the main ash-receiver 20 is entirely covered by the combination of the tray, the match-box and the tablet, the latter having an inner straight edge 44 contiguous to the side of the match-tray, and an outer curved edge 45 that is shaped to the inner contour of the annular frame 22. The ash-tray ends 27ª are shaped to the same circle contour, the circle being completed by the outer wall 26 of the match-pocket, so that the three members 23, 24 and 25 form the components of a unitary design having a circular border.

At its ends the tablet 25 is pivoted upon a wire 25ª mounted in the annular flange 26, so that the tablet may be turned up to afford access to the match-striking leaf 46 which is carried by the tablet and is confined thereon by a segmental plate 47 having a segmental opening 48 therein through which the coated match-striking surface of the leaf 46 is exposed. To form this tablet 25, a piece of sheet-metal may be folded, and a space 49, Figure 2, may be left between the folds for the reception of the leaf 46, which is in the nature of a fabric suitably coated with match-striking material. Said leaf may be pulled out from between the folds or leaves of the tablet, for the purpose of renewal. The leaf for parlor matches may be covered with coarse emery, sand or the like. The tablet itself is preferably formed with a roughened surface 50, so that matches may be struck directly thereon instead of on said leaf.

For use with the safety matches there is provided a leaf of paper or fabric 46 coated on both sides sides and of segmental shape, having one straight edge and one curved edge. When one side is used up the plat may be removed and turned over and restored, thereby exposing a fresh surface. Preferably two leaves may be supplied. These leaves are preferably formed of a single piece, Figure 12, joining together at one point at 51 in their curved edges, thereby permitting them to be folded face to face and inserted like a single leaf in the tablet. This gives four surfaces for successive use. These double leaves may be cut out from paper or fabric in an inexpensive manner and then coated on both surfaces. A supply of these double leaves may be carried in a magazine 52, which may be in the form of a pocket or clip provided under the match-striking tablet, Figures 2 and 3.

Figure 16:
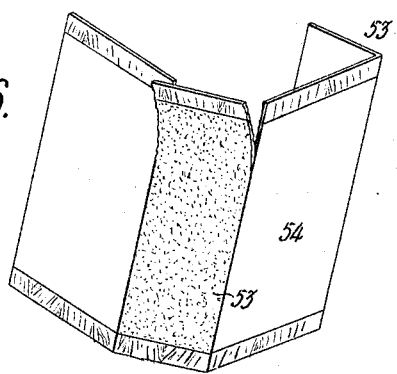
Figure 16 illustrates the stripping off of the coated side from a common match-box, to serve in the improved device as a match-striking tablet.

Instead of the specially-prepared ignition leaves seen at Figure 12, there may be used for ignition purposes the side 53 torn from an ordinary match-box 54, which is seen at Figure 16 disrupted so that one of its coated sides 53 may be separated from the rest of the box and inserted between the folds of the segmental tablet 25, as seen at Figure 10. If desired, the ends of the match-box side 53 may be trimmed on the dotted lines 55, to fit the edge of the tablet.

Figure 15:
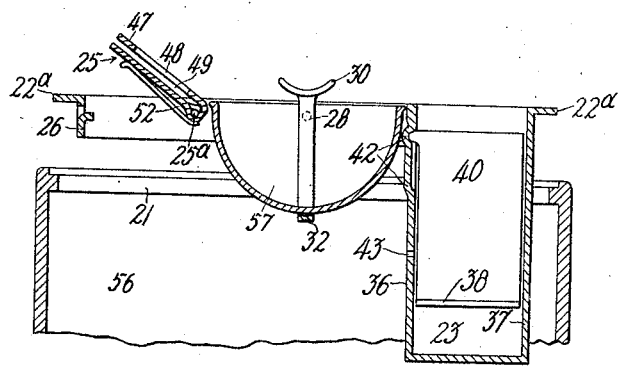
Figure 15 is a sectional elevation of the form seen at Figure 14, but showing the framing and match-receiver lifted off from the main ash-receiver.

Another form of the invention is seen at Figures 14, 15 and 16, in which the ash-receiver 56 is square or oblong instead of cylindrical. There is provided an ash-tray 57 of square or rectangular form, and the match-striking leaf or tablet 58 is made rectangular and oblong, to fit the detached side 53 of the usual match-box which may be inserted between the folds of the tablet, Figure 14. Sufficient space exists to accommodate both of the usual sides 53 of the ordinary match-box. Hence when the matches are removed from the box and placed in the match-safe, Figure 14, both sides 53 may be torn from the box 54 and inserted together in the tablet 58, leaving one surface exposed; and after this one is used up, it may be removed, leaving the other one exposed. The tablet is of such a size that the coated side 53 of the match-box will fit therein without change. To comport with the oblong rectangular shape of these salvaged sides 53, the tablet may be made oblong, and the entire structure may be given a corresponding square appearance, the ash-tray being also square-cornered, and the same being true of the match-receptacle, so that the tablet, ash-tray and match-receptacle taken together form a square or oblong assemblage as compared with the circular assemblage seen at Figure 1. The ash-receiver may also be of square form, as at Figure 14, and the frame may also be squared to correspond.

At Figures 22, 24 and 25 there is shown a form of cigar-extinguisher comprising a jaw 59 pivoted at 60 to the main plate 25 of the hinged match-striking tablet; there being provided upon said jaw a dependent finger-piece which may be reached by inserting the finger into the top of the ash-receiver, as at Figure 22, and pressing backwardly on the finger-piece 61, thereby lifting the match-striking tablet, whereupon the cigarette may be inserted between 59 and 25 and pinched, as at Figure 24; and the extinguished butt may fall directly into the main ash-receiver.

In the form of the invention seen at Figures 17 to 21, inclusive, there may be employed a square or rectangular ash-receiver 62, without having a detachable framing such as seen in other views; the ash-tray 63 being pivoted at 64, 65, directly to the opposite walls of the ash-receiver 62; and being removable by lifting the pivot 65 out of slot 66, as at Figure 18, thus permitting the contents of the ash-receiver to be dumped and permitting the ash-tray 63 to be cleaned. This ash-tray 63 may be flanked by a match-receptacle in the form of pockets 67, 68 separated by a partition 69, all of these being fixed in place, as this form of ash-receiver is designed mainly for use with short matches.

On the opposite side of the ash-receiver may be hinged at 70 an oblong tablet 71, having a match-striking leaf 72 therein. The hinge 70 extends along the top of the end 73 of the ash-receiver from front to back thereof; and when the tablet 71 is swung open, a cigarette may be laid upon a support 74 projecting inwardly from the back 75 of the ash-receiver, as at Figure 20. Moreover, the support 74 may be used as a jaw to co-operate with 71 to form a cigar-extinguisher, it being only necessary to lay the burning end of the cigarette down upon the jaw 74 and swing down the tablet 71 upon the same, as at Figure 21.

The preferred way of forming the leaf 72 is to divide a long web 76 of cloth or other fabric at short intervals, by transverse lines of perforations 77. After these perforations are formed, the web may be coated on both sides with match-igniting material 78. Then a length of the web may be severed therefrom, and the severed portion may be folded upon the perforated lines, the folds being preferably of zigzag style, as seen at the top of Figure 23. This enables the severed length of web to be folded up into compact form, to be inserted at 72 into the match-striking tablet 71, or into the tablet seen at Figure 14 or other figures.

Variations may be resorted to within the scope of the invention, and portions of the improvements may be used without others.

Having thus described my invention, I claim:

1. The combination with an ash-receiver, of a framing fitted thereto, an ash-depository upon said framing, a match-receptacle secured to said framing, and a match-striking tablet; said ash-depository, match-receptacle and match-striking tablet substantially filling said framing.

2. An ash-receiver provided with an ash-tray which serves as a partial closure for the ash-receiver, said ash-tray pivoted and hanging from its pivots, so as to tend to close the receiver, said ash-tray in the form of a trough extending across the top of the ash-receiver, a receptacle for matches provided in said ash-receiver and flanking said ash-tray on one side, and a match-striking tablet flanking said ash-tray on the other side, and co-operating with the ash-tray to form a closure for the receiver.

3. The combination with an ash-receiver, of a framing fitted thereto, an ash-tray pivoted to said frame, and a match-box secured to said frame; said frame, ash-tray and match-box removable as a unit from said ash-receiver.

4. The combination with an ash-receiver, of a framing fitted thereto, an ash-tray pivoted to said framing, a match-receptacle secured to said framing, and a match-striking tablet; said ash-tray, match-receptacle and match-striking tablet filling said framing, so as to prevent the emanation of odors from the ash-receiver, and said ash-tray and said tablet fitted to conform to each other and to said framing and said match-receptacle.

5. The combination with an ash-receiver, of a framing fitted thereto, an ash-tray pivoted to said framing, a match-receptacle secured to said framing; and a match-striking tablet also secured to said framing; said framing in the form of an annular brim, and said ash-receiver extending across said framing at the middle portion thereof.

6. The combination with an ash-receiver, of a framing fitted thereto, an ash-tray pivoted to said framing, a match-receptacle secured to said framing; and a match-striking tablet also secured to said framing; said framing in the form of an annular brim, and said ash-receiver extending across said framing at the middle portion thereof, said tablet shaped at its outer border to conform to said annular framing and at its inner border to conform to said ash-tray.

7. The combination with an ash-receiver, of a framing fitted thereto, an ash-tray pivoted to said framing, a match-receptacle secured to said framing; and a match-striking tablet also secured to said framing; said match-receptacle formed to conform to said ash-tray and arranged on the opposite side thereof from said tablet.

8. An ash-receiver having a cover comprising an ash-depository, a receptacle for matches provided within said ash-receiver at one side thereof and extending down from said cover, and a tablet on said cover provided with means for removably retaining a leaf of match-striking material.

9. An ash-receiver having a cover, said cover having a portion in the form of a match-striking tablet including leaves between which to confine match-striking material.

10. The combination of an ash-receiver having at its top an interior flange to form a shelf, and a removable framing resting upon said shelf and conforming to the shape of the ash-receiver, an ash-tray swiveled to said framing and extending across the middle thereof, a match-striking tablet, and a match-pocket flanking said ash-tray, said pocket rigidly secured to said annular framing and pendent therefrom.

11. The combination of an ash-receiver having at its top an interior flange to form a shelf, and a removable framing resting upon said shelf and conforming to the shape of the ash-receiver, an ash-tray swiveled to said framing and extending across the middle thereof, a match-striking tablet, and a match-pocket flanking said ash-tray, said pocket rigidly secured to said annular framing and pendent therefrom, said framing comprising a rim to rest upon said shelf, and also comprising a stiffening flange extending down from said rim.

12. The combination with an ash-receiver, of a framing fitted thereto, and a match receptacle secured to said framing; said framing and match-receptacle removable as a unit from said ash-receiver; said match-receptacle being in the form of a side pocket extending down from the framing, and corresponding to the contour of said framing.

13. The combination with an ash-receiver, of a framing fitted thereto, an ash-tray pivoted to said framing, and a match-receptacle secured to said framing; said framing, ash-tray and match-receptacle removable as a unit from said ash-receiver; said match-receptacle comprising a straight vertical wall which flanks the ash-tray and a curved outer wall which descends from the framing, and having a floor of corresponding form upon which the matches rest.

14. The combination with an ash-receiver, of a framing fitted thereto, an ash-tray pivoted to said framing, a match-box secured to said framing; said framing, ash-tray and match-box removable as a unit from said ash-receiver; said match-box comprising a straight vertical wall which flanks the ash-tray and a curved outer wall which descends from the framing, and having a floor of corresponding form upon which the matches rest, said floor adjustable up and down; and means to retain it in its upper position.

15. The combination with an ash-receiver, of a framing fitted thereto, an ash-tray pivoted to said framing, and a match-box secured to said framing; said framing, ash-tray and match-box removable as a unit from said ash-receiver; said match-box being in the form of a side pocket extending down from the framing, and corresponding on its outer side to the contour of said framing, and at its inner side corresponding to the contour of said ash-tray; a partition extending up from said framing and having a projection, and the sides of said pocket being of springy construction and having a depression to receive said projection to lock the framing.

16. The combination with an ash-receiver, of a framing fitted thereto, an ash-tray pivoted to said framing, and a match-box secured to said framing; said framing, ash-tray and match-box removable as a unit from said ash-receiver; said match-box being in the form of a side pocket extending down from the framing, and corresponding on its outer side to the contour of said framing, and at its inner side corresponding to the contour of said ash-tray, the latter having an inner straight edge contiguous to the side of the ash-tray, and an outer curved edge conforming to the contour of the annular framing.

17. The combination with an ash-receiver, of a framing fitted thereto, an ash-tray pivoted to said framing, and a match-box secured to said framing; said framing, ash-tray and match-box removable as a unit from said ash-receiver, said match-box being in the form of a side pocket extending down from the framing, and corresponding on its outer side to the contour of said framing, and at its inner side corresponding to the contour of said ash-tray, the latter having an inner straight edge contiguous to the side of the ash-tray, and an outer curved edge conforming to the contour of the annular framing, the ash-tray ends being shaped to agree with the same circular contour, so that the ash-tray, match-box and the striking tablet form the components of a unitary design having a circular border.

18. An ash-receiver having a support for an ash-tray which serves as a closure for the ash-receiver, said ash-tray pivoted by its ends, a receptacle for matches provided within said ash-receiver and flanking said ash-tray on one side, and a match-striking tablet flanking said ash-tray on the other side, said tablet hinged so that it may be turned up and comprising an open frame under which the match-striking material is confined, and by which it is exposed for use.

JACOB E. NEAHR.